UNITED STATES PATENT OFFICE.

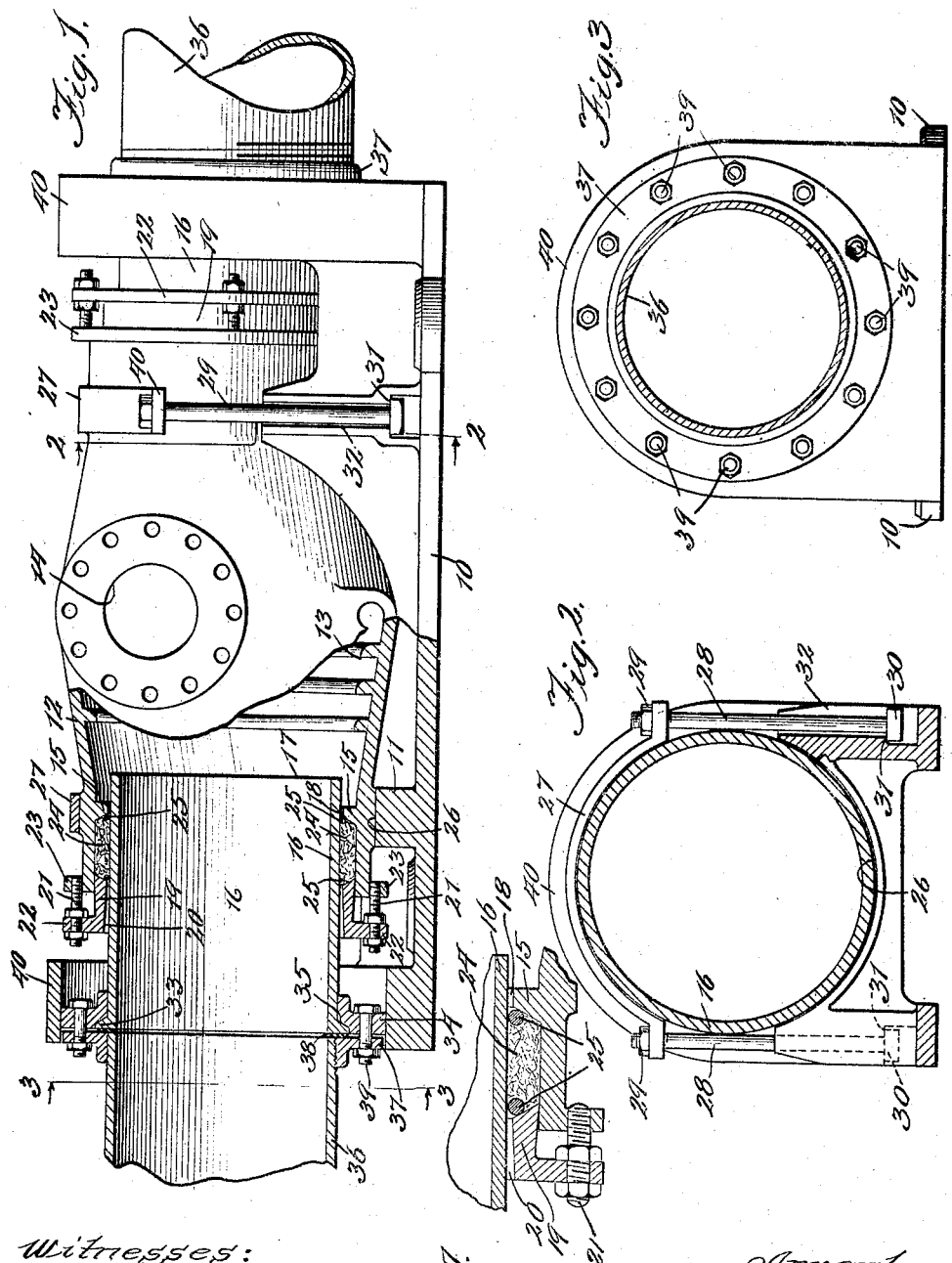

WILLIAM H. PEARCE, OF CHICAGO, ILLINOIS.

HEAT-DISTRIBUTING SYSTEM.

997,002.  Specification of Letters Patent.  Patented July 4, 1911.

Application filed June 20, 1910. Serial No. 567,778.

*To all whom it may concern:*

Be it known that I, WILLIAM H. PEARCE, a citizen of the United States, residing at Chicago, in the county of Cook and State of Illinois, have invented certain new and useful Improvements in Heat-Distributing Systems, of which the following is a specification.

This invention relates to improvements in heat distributing systems for distributing a heating medium in the form of steam, hot water, hot air, or the like from a common supply or generating plant to various points of use. Heretofore in systems of this character considerable difficulty has been experienced in overcoming the effects of the expansion and contraction of the service mains due to the variations in temperature, and in providing a joint or fitting which will permit of such expansion and contraction, and which will at the same time prevent the escape of leakage of the heating medium, especially when the heating medium is steam.

It is one of the objects of the present invention to provide an improved joint or fitting for connecting the approximate ends of adjacent pipe sections which will prevent the escape of the heating medium while at the same time the pipe sections will readily adjust themselves by the expansion and contraction of the sections of the main.

A further object is to provide an improved anchor or support for the joint or fitting, the ends of which surround the joint or fitting in such a manner as to support the parts in true alinement, no matter in what position the joint or fitting may be placed, and at the same time will overcome or prevent lateral displacement of the parts.

A further object is to provide an improved anchor or support for the joint so constructed that access may be readily had to the fastening screws or devices for operating the same to adjust the packing gland.

To the attainment of these ends and the accomplishment of other new and useful objects, as will appear, the invention consists in the features of novelty in the construction, combination and arrangement of the several parts hereinafter more fully described and claimed, and shown in the accompanying drawing illustrating an embodiment of the invention, and in which—

Figure 1 is a side view partly in elevation and partly in section, showing an improved joint or fitting of this character constructed in accordance with the principles of this invention. Fig. 2 is a sectional view on line 2—2 of Fig. 1. Fig. 3 is a sectional view on line 3—3 of Fig. 1. Fig. 4 is an enlarged detail sectional view of a portion of the joint showing the packing.

Referring more particularly to the drawing, and in the present exemplification of the invention, the numeral 10 designates a support comprising a base which is provided with supporting stands 11 spaced from each other and upon which the joint or fitting rests. The joint or fitting comprises a sleeve 12 which is preferably enlarged at its center, as at 13, to form a chamber with which the openings through the ends of the sleeve communicate. The sleeve may also be provided with an opening 14 which communicates with the chamber 13 for the purpose of securing a branch connection to the sleeve. As the construction of each end of the sleeve is the same, the specific description of one end will apply equally as well to the other. Arranged within the sleeve and spaced from the extremity of the end of the opening is a circumferential flange 15 which forms a shoulder, and a pipe section 16 extends into the open end of the sleeve so that its extremity 17 will project through and beyond the flange 15. The diameter of the pipe section 16 is somewhat less than the diameter of the opening formed by the flange 15, so that when the pipe section is secured in position, a space 18 will be formed between the flange and the periphery of the pipe. A packing gland 19 is also provided which surrounds the pipe section, and is spaced therefrom to form a space 20. This packing gland is supported and secured in position by means of fastening devices 21 preferably in the form of adjusting screws which pass through a flanged portion 22 on the gland and a coöperating flange 23 on the end of the sleeve. The packing gland extends into the space between the sleeve and the pipe section in advance of the flange 15 in the usual manner, and packing material 24 is disposed between the pipe section and the sleeve and within the space formed between the end of the packing gland 19 and the approximate wall or face of the flange 15, so that when the packing gland 19 is adjusted in the usual manner, the packing material 24 will be compressed to form a fluid-tight joint between the pipe sections and the sleeve. In order to prevent the packing material from being forced into the spaces 18 and 20 respectively between the flange and the pipe section, and the pipe section and the packing gland 19, encircling members 25 are provided which are preferably in the form of packing rings. These members surround and are preferably supported by the pipe section, and one is arranged adjacent the entrance to each of the spaces, and are of such size as to extend across and form obstructions to the spaces, so that when the packing gland 19 is adjusted, the packing material 24 will be compressed and the rings or encircling members 25 will prevent the packing material from entering the spaces while at the same time the pipe section will be held out of engagement with the faces of the flange and the packing gland.

Portions 26 of the periphery of the sleeve 12 adjacent each end are constructed on true circles, and the faces of the stands or supports 11 are also constructed on true circles to coincide with the portions 26. The sleeve is anchored to the support, preferably by means of straps 27, which extend over the sleeve and rest upon the portions 26, and fastening devices 28 are provided for securing the straps in position. These fastening devices are preferably in the form of headed bolts, one extremity of which passes through suitable apertures in the extremities of the straps 27 and are held from disengagement therewith by means of nuts or collars 29. The headed ends 30 of the fastening devices are adapted to pass under shoulders 31 formed preferably on the supporting stands or seats 11 and the outer faces of these supports or seats are provided with grooves 32 through which a portion of the fastening device 29 extends. The straps 27 may be adjusted by the nuts or collars 29 so as to grip the sleeve, and when the nuts or collars are so adjusted, the heads 30 of the fastening devices will be drawn tightly against the shoulders 31 and the sleeve will be securely anchored.

The pipe section 16 is provided at its free end with a radial peripheral flange 33, and loosely surrounding said extremity is a collar 34 which closely fits the pipe section, and this collar is provided with a recessed portion 35 in its outer face adapted to receive the flange 33. Another pipe section 36 is provided with a flange 37 adapted to coöperate with collar 34, which latter also forms a flange, and arranged between these two flanges 37, 34, is a packing gland 38. Suitable fastening devices 39 in the form of bolts are provided which pass through these flanges 37, 34 for securing the pipe sections together, and for holding the packing gland 33 against displacement. By the provision of the radial flange 33 it will be apparent that the heating fluid will be confined within the pipe section and will be prevented from escaping between the ends of the adjacent pipe sections, inasmuch as the flange 33 projects for some distance beyond the end of the pipe section 36 and the packing gland 33 coöperates with this flange portion to prevent the steam or fluid from leaking through the joint formed between the flange 33 and the collar or supplemental flange 34.

The support 10 is provided at each extremity with an annular portion 40 spaced some distance from the support or stand 11, and also from the adjacent extremity of the sleeve 12, and the packing gland 19. This annular portion 40 is preferably of some width and surrounds the pipe sections beyond the sleeve, and is so located that the supplemental flange formed by the collar 34 and the flange 37 will be encircled thereby. The inner face of this annular portion 40 contacts with the periphery of the collar 34 and the flange 39, and forms a bearing therefor within which the latter parts freely move during the longitudinal adjustment of the pipe sections and thereby forms a support to hold the pipe sections in true longitudinal adjustment with respect to the sleeve, while at the same time it will prevent lateral displacement or adjustment of the pipe sections. This annular portion 40 also serves to support the pipe section 16 out of engagement with the sleeve 12, and also out of engagement with the flange 15, and the packing gland 19. By thus supporting the pipe section 16 so that it will not contact with the sleeve or the flange or packing gland, it will be apparent that the deposit or formation of foreign substances on the adjacent faces of the parts will not interfere with the proper longitudinal adjustment, while at the same time the arrangement of the packing herein shown will prevent the escape of the heating fluid between the joints. It will also be apparent that by supporting the sleeve 12 at points remote from the extremities thereof, and by spacing the encircling portion 40 of the base 10 some distance from the sleeve, ready access may be had to the adjusting devices 21 without dismembering or interfering with the other parts. It will also be apparent that by the provision of the encircling members 40 and the anchoring straps 27, the joint or coupling may be supported at any angle and at the same time the parts will be held in true alinement.

What is claimed as new is:

1. In a heat distributing system, a service main made in sections, a coupling for the proximate ends of adjacent sections comprising a sleeve, the ends of said main sections operating loosely in the ends of the sleeve, portions of the periphery of the sleeve remote from the ends being constructed on true circles, supporting seats for the sleeve coinciding with the circular portions of the sleeve and against which the said portions rest, and means also engaging and coinciding with the said circular portions of the sleeve and coöperating with the said seats for anchoring the sleeve.

2. In a heat distributing system, a service main made in sections, a coupling for the proximate ends of adjacent sections comprising a sleeve, the ends of said main sections operating loosely in the ends of the sleeve, portions of the periphery of the sleeve remote from the ends being constructed on true circles, supporting seats for the sleeve coinciding with the circular portion of the sleeve and against which the said portions rest, straps passing over the sleeve and engaging the said circular portions of the periphery and means engaging the ends of the straps and the said seats for anchoring the sleeve.

3. In a heat distributing system, a service main made in sections, a coupling for the proximate ends of adjacent sections comprising a sleeve, the ends of said main sections operating loosely in the ends of the sleeve, portions of the periphery of the sleeve remote from the ends being constructed on true circles, supporting seats for the sleeve coinciding with the circular portions of the sleeve and against which the said portions rest, straps embracing the sleeve and engaging the said circular portions of the periphery, and fastening devices connected with the ends of the strap and detachably engaging the portions of the seats for anchoring the sleeve.

4. In a heat distributing system, a service main made in sections, a coupling for the proximate ends of adjacent sections comprising a sleeve, the ends of the main sections operating loosely in the ends of the sleeve, means for anchoring the sleeve, and means encircling and forming a bearing for the main sections for supporting said sections for free movement and guiding the sections in true longitudinal relation to the sleeve and for preventing lateral movement of the main sections with respect to the sleeve.

5. In a heat distributing system, a service main made in sections, a coupling for the proximate ends of adjacent sections comprising a sleeve, the ends of the main sections operating loosely in the ends of the sleeve, a support for the sleeve, means encircling the sleeve remote from the extremities thereof for anchoring the sleeve to the support, and means encircling and directly engaging the main sections beyond the ends of the sleeve for supporting and guiding the main sections in true longitudinal relation and for preventing lateral movement of the main sections with respect to the sleeve.

6. In a heat distributing system, a service main made in sections, a coupling for the proximate ends of adjacent sections comprising a sleeve, the ends of the main sections operating loosely in the ends of the sleeve, a support for the sleeve, means encircling the sleeve remote from the extremities thereof for anchoring the sleeve to the support, means integral with the support and encircling the main sections, the last said means having direct engagement with the main sections adjacent the respective extremities of the sleeve and being spaced from the sleeve encircling means for supporting and guiding the main section in true longitudinal relation and for preventing lateral movement of the main sections with respect to the sleeve.

7. In a heat distributing system, a service main made in sections, a coupling for the proximate ends of adjacent sections comprising a sleeve, the ends of the main sections operating loosely in the ends of the sleeve, a support for the sleeve, means for anchoring the sleeve to the support, means integral with the support and encircling the main sections beyond the ends of the sleeve, said encircling means having engagement with the main sections for supporting the latter for free movement and for guiding the sections in true longitudinal relation with the sleeve and for holding the main sections out of engagement with the sleeve, and packing disposed between the main sections and the sleeve.

8. In a heat distributing system, a service main made in sections, a coupling for the proximate ends of adjacent sections comprising a sleeve, the ends of the main sections operating loosely in the ends of the sleeve, a support for the sleeve, means for anchoring the sleeve to the support, means integral with the support and encircling the main sections beyond the ends of the sleeve, said encircling means having engagement with the main sections for guiding the sections in true longitudinal relation with the sleeve and for holding the main sections out of engagement with the sleeve, packing disposed between the main sections and the sleeve, and means forming an obstruction to the space between the main section and the sleeve for preventing the packing from being forced into said space.

9. In a heat distributing system, a service main made in sections, a coupling for the approximate ends of adjacent sections comprising a sleeve, said sleeve being provided with interior shoulders spaced from the respective ends of the sleeve, the ends of the main sections operating loosely in the ends of the sleeve, a support for the sleeve, means for anchoring the sleeve to the support, means for supporting and guiding the main sections into the ends of the sleeve and for holding the sections out of engagement with the sleeve and shoulders, packing arranged between the main sections and sleeve, and encircling bands surrounding the respective sections of the main and forming obstructions to the packing to prevent the latter entering the spaces between the sections and the sleeve shoulders.

10. A coupling for the heat main sections of a heat distributing system comprising a sleeve provided with an interior annular flange remote from the end thereof and into which end the end of one of the sections loosely passes, the end of said section passing through and beyond the said flange, means for holding the main section out of engagement with the sleeve and flange, a packing gland, out of engagement with which the heat main section is also held, packing disposed between the sleeve and the packing gland and the main section respectively, and means extending across the spaces between the main section and flange, and the gland respectively for preventing the packing from entering said spaces.

11. A coupling for the heat main sections of a heat distributing system comprising a sleeve provided with an interior annular flange remote from the end thereof and into which end the end of one of the sections loosely passes, the end of said section passing through and beyond the said flange, means for holding the main section out of engagement with the sleeve and flange, a packing gland out of engagement with which the heat main section is also held, packing disposed between the sleeve and the packing gland and the main section respectively, and rings encircling the heat main section and forming obstructions to the spaces between the main section and the gland and said flange respectively.

12. A coupling for the heat main sections of a heat distributing system comprising a sleeve into which one end of a pipe section loosely passes, the other end being provided with a radial peripheral flange, and a collar loose on the pipe section surrounding the section and having engagement therewith, said collar being provided with a recessed portion adapted to receive the said flange and with the recessed face substantially flush with the extremity of the pipe section.

13. A coupling for the heat main sections of a heat distributing system comprising a sleeve into which one end of a pipe section loosely passes, the other end being provided with an integral peripheral radial flange, one face of which is coincident with the end face of the pipe section, a collar closely surrounding the pipe section and having a recess in one face to receive the flange, one face of the collar being substantially flush with the face of the flange, a second pipe section provided with a peripheral flange and arranged end to end with the first pipe section and with the face of the flange adjacent the face of the flange on the first said section and the face of the collar, and fastening devices passing through the collar and the second said flange.

14. A coupling for the heat main sections of a heat distributing system comprising a sleeve into which one end of a pipe section loosely passes, the other end being provided with an integral peripheral radial flange, one face of which is coincident with the end face of the pipe section, a collar closely surrounding the pipe section and having a recess in one face to receive the flange, one face of the collar being substantially flush with the face of the flange, a second pipe section provided with a peripheral flange and arranged end to end with the first pipe section and with the face of the flange adjacent the face of the flange on the first said section and the face of the collar, fastening devices passing through the collar and the second said flange, and a packing arranged between the adjacent ends of the pipes.

15. In a heat distributing system, a service main constructed in sections, a coupling for the proximate ends of adjacent sections comprising a sleeve, the ends of the main sections operating loosely in the ends of the sleeve, means for anchoring the sleeve, and means forming an extended bearing for the main sections for supporting the latter for free movement and guiding the sections in true longitudinal relation to the sleeve and for preventing lateral movement of the main sections with respect to the sleeve.

In testimony whereof I have signed my name to this specification, in the presence of two subscribing witnesses, on this 6th day of May A. D. 1910.

WILLIAM H. PEARCE.

Witnesses:
M. W. CANTWELL,
J. H. JOCHUM, Jr.